United States Patent [19]

Ubell et al.

[11] Patent Number: 5,895,467
[45] Date of Patent: Apr. 20, 1999

[54] SELECTIVELY SWITCHING MEMORY ACCESS PERMISSION FOR MANIPULATING DATA IN A DATABASE

[75] Inventors: Michael Ubell, Oakland, Calif.; Keith Kelleman, Portland, Oreg.

[73] Assignee: Informix Software, Inc., Menlo Park, Calif.

[21] Appl. No.: 08/835,967

[22] Filed: Apr. 11, 1997

[51] Int. Cl.$^6$ .................................................. G06F 17/30
[52] U.S. Cl. .................. 707/9; 707/1; 707/2; 707/8; 707/10; 707/103
[58] Field of Search ...................... 707/2, 3, 8, 9, 707/10, 4, 5, 102, 101, 103, 1, 7, 100; 711/153, 100, 150, 200, 103; 395/610, 477, 186

[56] References Cited

U.S. PATENT DOCUMENTS

| 5,210,844 | 5/1993 | Shimura et al. | 711/153 |
| 5,566,321 | 10/1996 | Pase et al. | 711/153 |
| 5,572,673 | 11/1996 | Shurts | 395/186 |
| 5,577,240 | 11/1996 | Demers et al. | 707/8 |
| 5,590,326 | 12/1996 | Manabe | 711/150 |
| 5,627,987 | 5/1997 | Nozue et al. | 711/200 |
| 5,651,139 | 7/1997 | Cripe et al. | 711/163 |
| 5,692,182 | 11/1997 | Desai et al. | 707/10 |

OTHER PUBLICATIONS

Shivakumar Venkataraman et al., The Impact of Data Placement on Memory Management for Multi–Server OODBMS, IEEE 1995, 355–364, 1995.
Bach, M.J. *The Design of the UNIX Operating System*, New Jersey: Prentice Hall, 1986, pp. 165–170, 181.

*Primary Examiner*—Wayne Amsbury
*Assistant Examiner*—Srirama Channavajjala
*Attorney, Agent, or Firm*—Fish & Richardson P.C.

[57] ABSTRACT

Routines for manipulating data in a database are performed by a database server by determining whether or not a database manipulation routine is to be isolated from a specified range of memory, and, in response, selectively switching memory access permission to the specified range of memory (e.g., from read/write to read-only) for the database manipulation routine under consideration. The database manipulation routine is then executed using the selectively switched memory access permission. A database manipulation routine that is to be isolated can be executed with read-only memory access thereby protecting the specified range of memory (e.g., corresponding to core data structures) from improper modification.

50 Claims, 8 Drawing Sheets

SELECTIVELY SWITCHING MEMORY ACCESS PERMISSION FOR MANIPULATING DATA IN A DATABASE

BACKGROUND

This invention relates to accessing information in a database.

A database is a body of information that is logically organized so that it can be stored, searched and retrieved in a coherent manner by a "database engine"—a collection of software methods for manipulating data in the database. The software methods typically are implemented as a set of callable routines, either functions, which return a value, or procedures, which do not return a value.

Databases generally fall into three categories: relational databases, object-oriented databases and object-relational databases. A relational database (RDB) is a collection of fixed-field two-dimensional tables that can be related (or "joined") to each other in virtually any manner a database developer chooses. The structure of a relational database can be modified by selectively redefining the relationships between the tables. A database engine may perform complex searches on a relational database quickly and easily by using any of various database query protocols such as the method expressed by the Structured Query Language (SQL) or by other mechanisms. The relationships between the tables enable results of a search to be automatically cross-referenced to corresponding information in other tables in the database.

Figure 1:
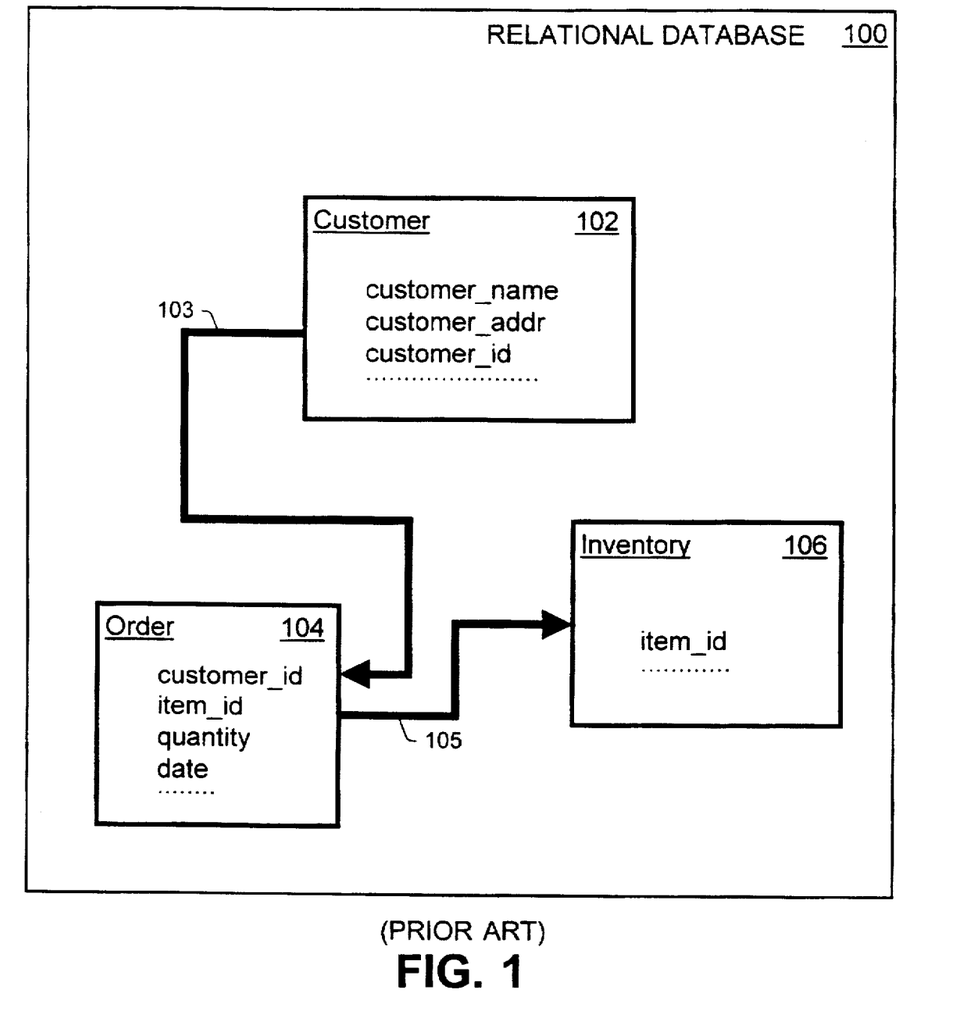
FIG. 1 is a block diagram of a prior art relational database.

As shown in FIG. 1, for example, a relational database 100 includes a customer table 102 which is joined by a logical link 103 to an order table 104 which in turn is joined by a logical link 105 to an inventory table 106. A user may query the database 100, for example, for all order numbers higher than a threshold value. Because the order table 104 is joined with the customer table 102 and the inventory table 106, a list of order numbers identified in response to the query can be retrieved and displayed along with the respective customer names and inventory items that correspond to the identified order numbers.

An object-oriented database (OODB) is a collection of "objects"—software elements that contain both data and methods for manipulating that data. In contrast to a relational database which can store only numeric or character-type data, an OODB can store data of virtually any type (text, 3D graphic images, video clips, etc.). An OODB stores its constituent objects in a hierarchy of classes with associated methods so that the OODB contains much of the logic it needs to do useful work. A relational database in contrast contains only data and must rely on external application software to perform useful functions with the data.

An object-relational database (ORDB) is a hybrid of the other two types. Extended data (e.g., a movie file) may be stored and retrieved in an ORDB either as part of a row or as a binary large object (BLOB)—an undifferentiated mass of data. An ORDB also can access methods (e.g., a utility for viewing movie files) for manipulating the data contained within a BLOB. These methods may be maintained separately from the database engine or may be linked to it depending on the particular ORDB implementation.

Figure 2:
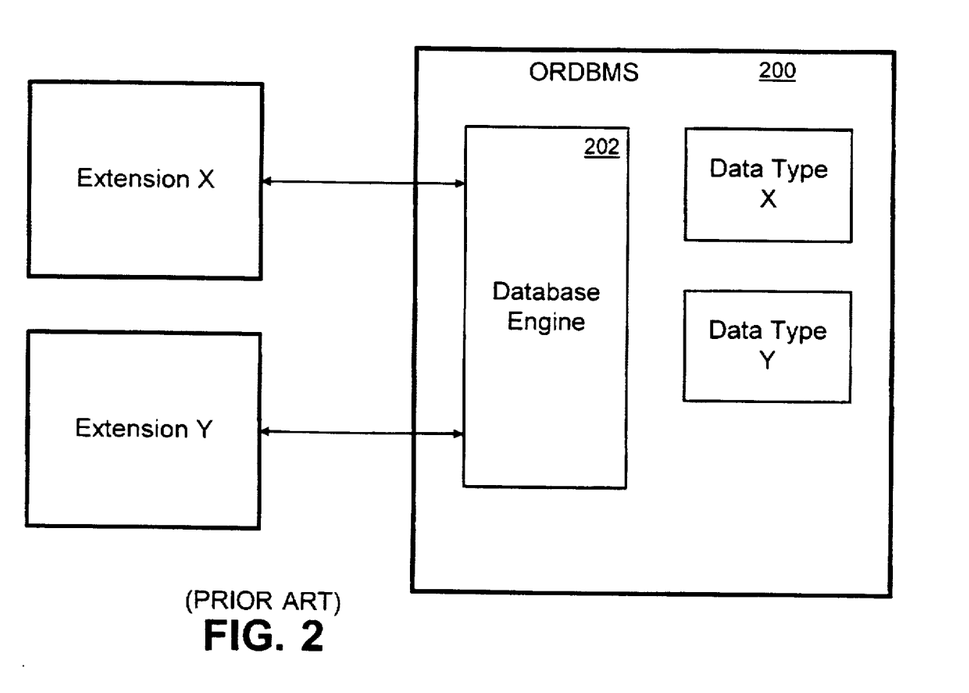
FIG. 2 is a block diagram of a prior art extensible object-relational database management system.

In an extensible object-relational database management system (ORDBMS) such as the Informix® Universal Server (IUS®), methods for manipulating extended data are linked directly to the database engine so that the extended data is treated as a "native" data type—that is, a data type that the ORDBMS itself can manipulate without resorting to external applications. In FIG. 2, for example, an extensible ORDBMS 200 has extensions X and Y, which respectively contain methods for manipulating data types X and Y, linked directly to the database engine 202. In response to a database query that points to data of type X, for example, the database engine 202 automatically invokes the methods in extension X to manipulate the data in an appropriate data type-specific manner.

A non-extensible ORDBMS, in contrast, does not allow data manipulation methods for arbitrary data types to be linked to the database engine but rather requires the use of multiple data type-specific engines, interconnected via layers of middleware, to manage multiple data types. As a result, a non-extensible ORDBMS generally exhibits reduced performance and presents a developer with increased complexity in deploying new applications.

SUMMARY

In one aspect of the invention, routines for manipulating data in a database are performed by a database server by determining whether or not a database manipulation routine is to be isolated from a specified range of memory, and, in response, selectively switching memory access permission to the specified range of memory (e.g., from read/write to read-only) for the database manipulation routine under consideration. The database manipulation routine is then executed using the selectively switched memory access permission. A database manipulation routine that is to be isolated can be executed with read-only memory access thereby protecting the specified range of memory from improper modification.

Whether or not a database manipulation routine is to be isolated from a specified range of memory (e.g., core memory in which core data structures reside) may be determined by inspecting a parameter associated with the database manipulation routine. The parameter can be set to value that specifies a class of processor (e.g., a multi-threaded virtual processor) for executing the database manipulation routine. A certain class value indicates that the corresponding processor should be isolated from core memory by restricting the processor's core memory permissions to read-only. Other class values can indicate that the corresponding processor need not be isolated from core memory and thus may have full R/W permission to core memory.

Selective switching of memory access permissions may be accomplished through a local procedure call which sets the memory access permission for the database manipulation routine to read-only for core memory if the database manipulation routine is determined to be "untrusted"—i.e., a routine that is to be isolated from core memory. Alternatively, the memory access permission for the database manipulation routine may be set to read/write for core memory if the database manipulation routine is determined to be a "trusted" routine—i.e., a routine that need not be isolated from core memory.

When an untrusted routine is to be executed, a local procedure call causes the thread of execution for the database manipulation routine to migrate from a processor that has read/write permission to core memory to a processor that has read-only access to core memory. The thread migrates to a memory region that is logically partitioned form core memory but which is in the same memory address space as core memory. The thread is in "a trusted context" when it has read/write permission to the core memory and in "an untrusted context" when the thread has read-only access to core memory.

When executing in an untrusted context, the thread nevertheless may need to use a resource in the core memory to execute the database manipulation routine. Upon detecting that condition, a switch from the untrusted context to another trusted context is performed to allow, for example, the thread to modify core memory. After the thread has completed its use of the resource in core memory, a switch is performed from the trusted context back to the untrusted context. Similarly, after the untrusted routine has completed execution, a switch is performed from the untrusted context back to the original trusted context. Any arbitrary number of switches may be performed between a trusted context and an untrusted context.

In performing a context switch from an untrusted context to a trusted context, entry into core memory may be limited to a predetermined set of one or more permissible execution entry points, for example, identified in a predetermined call back table. If a specified entry point appears in the call back table, entry at that point in core memory is allowed. If, however, a specified entry point does not appear in the call back table, entry at that point in core memory is blocked.

In another aspect of the invention, routines for manipulating data in a database are performed by a database server by dividing a memory address space into memory segments (e.g., a main segment and one or more fenced segments). A database manipulation routine, for example, an untrusted user-defined routine, selectively may be executed in a fenced memory segment while preventing the routine from writing information to another of the memory segments. The database manipulation routine executing in the fenced memory segment can be enabled to read information from another memory segment or to migrate to another memory segment to perform a predetermined routine. Other routines, for example, trusted core database routines can be executed in the main segment with full R/W access to all memory segments. In addition, multiple database manipulation routines may be executed in respective ones of the memory segments, each database manipulation routine having read-only access to all memory segments other than its own memory segment.

Advantages of this invention may include one or more of the following. Allowing users to define their own routines and to link those user-defined routines to the database engine enables the database server to manage an arbitrary collection of rich data types (e.g., images, video, sound, maps, complex financial instruments, time series data) quickly and efficiently. Any risk that a user-defined routine containing faulty logic will corrupt the database is minimized because such user-defined routines are isolated from the core data structures and functions of the database server. Improper modification of the core memory used by the database server is prevented by executing user-defined routines with a processor (e.g., a virtual processor) that has limited privileges. The virtual processor is allowed full read and write (R/W) access either to a specified range of memory or to its own auxiliary memory segment depending on the particular implementation, but is limited to read-only access to the core database server memory. As a result, the user is provided with enhanced flexibility while high degrees of reliability and performance are maintained for the database server.

By enabling a routine to specify a class of virtual processor under which the routine is to be executed, database developers are provided with a flexible and powerful mechanism for isolating untrusted routines. A routine may be run as trusted or untrusted simply by changing a parameter to designate a virtual processor class with full R/W privileges or a "fenced" virtual processor, which has read-only privileges to a designated region of memory.

In a configuration where the memory is logically partitioned into segments, the memory segments occupy different portions of the same memory address space. As a result, the thread of execution for the user-defined routine can move between memory segments quickly and easily. Moreover, internal routines provided by the database server permit a fenced virtual processor to access resources present in the core memory segment while protecting the contents of the core memory segment from being improperly modified. Isolation of untrusted user-defined routines is thereby realized while high degrees of performance and scalability are maintained for the database server.

Other advantages and features will become apparent from the following description, including the drawings and claims.

DETAILED DESCRIPTION

The use of an extensible database management system (DBMS) to store persistent data provides several advantages that are not available when a non-extensible DBMS is used as a data repository. The ability to link routines for manipulating virtually any type of data directly to the database engine allows developers to tailor the DBMS to meet the specific needs of an enterprise. Moreover, the ability to implement custom functions along with core DBMS functionality in a single-engine solution enhances the DBMS' performance, transaction integrity, scalability and manageability both for traditional and complex data types.

Figure 3A:
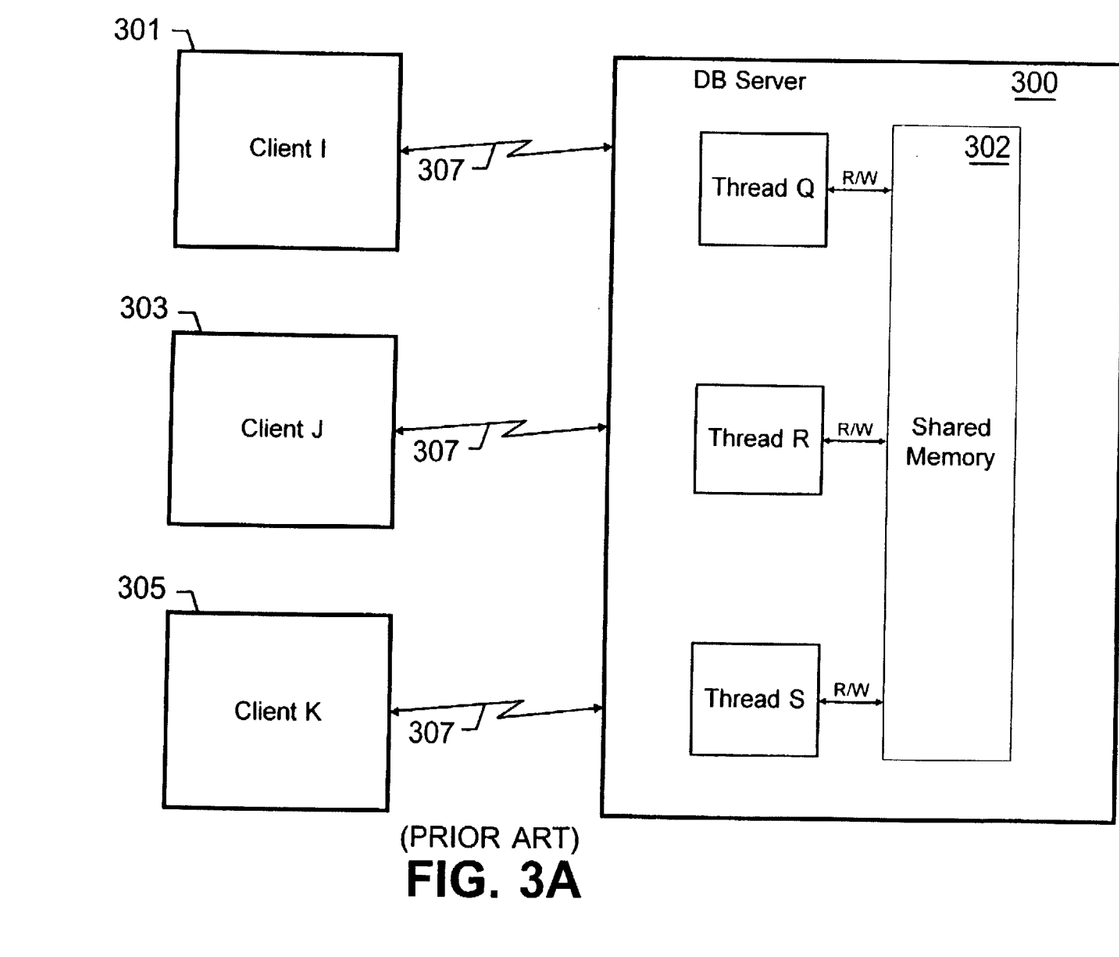
FIGS. 3A and 3B are examples of prior art database server architectures.

Providing such a large degree of flexibility and extensibility to developers potentially may cause problems, however, depending on the DBMS architecture used. In the architecture of FIG. 3A, for example, a database server 300 receives database queries from clients I, J and K (301–305) via communication links 307 and conveys the database queries to threads Q, R or S as appropriate. Each client may communicate with a separate thread, as shown in FIG. 3A, or a single multi-threaded process may receive queries from two or more clients. In either case, the threads in turn make library calls to invoke predefined routines that perform the desired operations on the database. In FIG. 3A, all threads residing in the database server 300 execute their respective routines in the same memory address space—namely shared memory 302—for which each thread has full R/W privileges.

Ordinarily, allowing threads Q, R and S freely to read from and write to shared memory 302 would not cause problems with system operations because each of the underlying routines invoked by the threads would have been written by the same software vendor and thoroughly tested for correct operation and interoperability with every other routine linked to the database server 300. In some cases, however, a relatively unsophisticated developer or end-user of a DBMS may write, and fail to properly debug, a data manipulation routine that is faulty—i.e., execution of the routine causes it to modify the shared memory 302 of the database server 300 in an inappropriate way, potentially crashing the DBMS or corrupting the database or both.

Figure 3B:
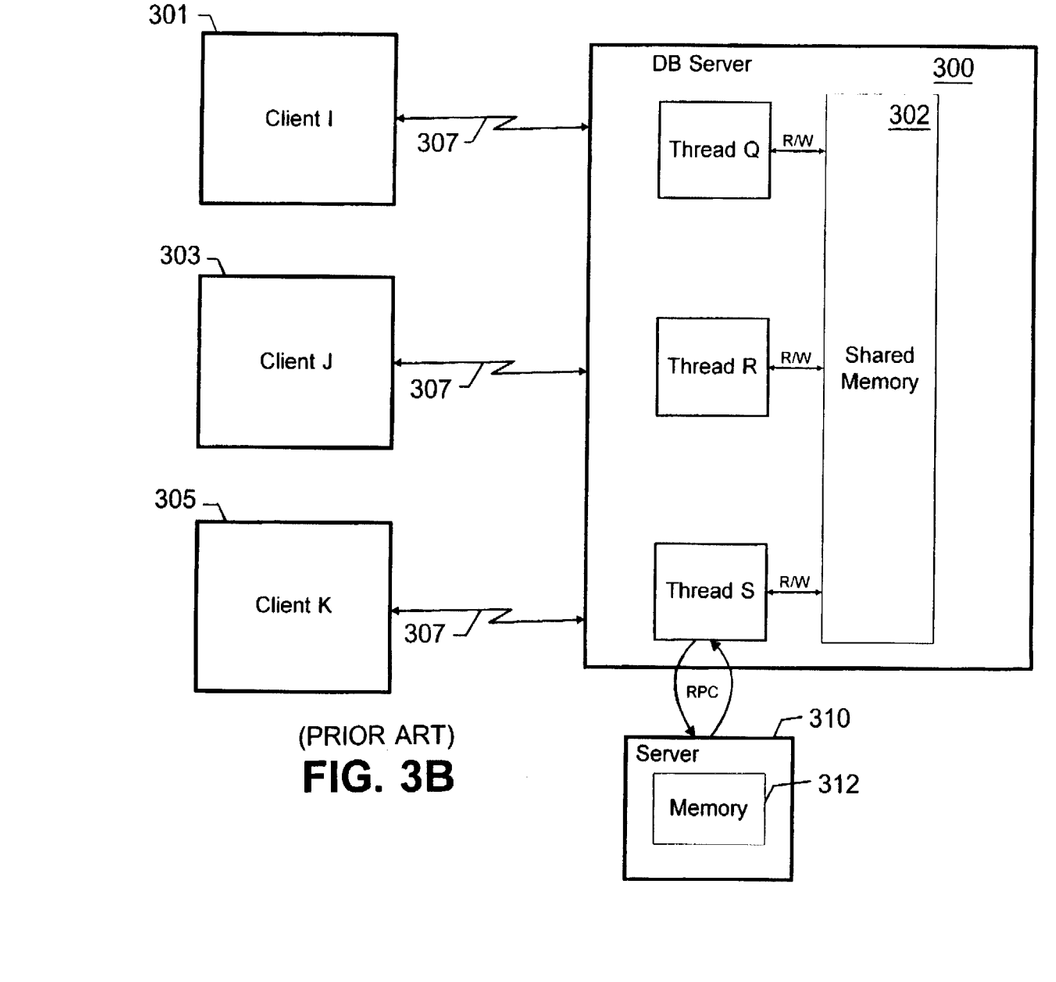

FIG. 3B depicts a solution for protecting the database server's shared memory from being damaged by the execution of a faulty user-defined routine (UDR). In the architecture of FIG. 3B, database manipulation requests received from clients 301–305 are handled in different manners depending on whether the underlying routines to which they correspond are regarded as "trusted" (e.g., UDRs that have been thoroughly tested to ensure that they do not improperly modify shared memory 302 or otherwise conflict with other routines) or "untrusted" (e.g., UDRs that have not been thoroughly tested). For those UDRs designated as belonging to a trusted class, the calling thread executes the routine in shared memory 302 with full R/W privileges in the same manner as discussed above in connection with FIG. 3A.

In the case of untrusted UDRs, however, the invoking thread (e.g., thread S) performs a remote procedure call (RPC)—a programming mechanism that causes the thread to migrate from one memory address space to another memory address space while maintaining program context—to another server 310. Once the thread has migrated to server 310, the untrusted UDR is executed in memory 312 and the result is returned by passing the thread back to DB server 300. Because memory 312 in server 310 represents a memory address space that is separate and distinct from the shared memory 302 in server 300, any routine executing on server 310 is incapable of directly modifying shared memory 302. In effect, the RPC performed by thread S isolates the underlying execution thread from the database server 300 thus protecting shared memory 302 from improper modification by the untrusted routine.

Traversing between different memory address spaces is a relatively time-consuming activity, however. Each RPC to a different memory address space typically incurs a considerable amount of overhead time in marshaling and recovering arguments and results between the different servers. Moreover, the RPC-based architecture relies on the proper operation of a communications link between two or more different address spaces, each of which typically is associated with a separate computer system. Such inter-system communications are considerably less reliable than intra-system communications. The RPC-based isolation architecture consequently suffers from relatively poor performance and reliability.

These and other problems associated with the RPC-based isolation architecture are addressed by a database server architecture in which certain untrusted methods such as UDRs can be isolated from the core data structures and from trusted methods such as the core database engine routines. Isolation can be achieved by using either of at least two different models: a multi-process model and a single-process segment model.

Figure 4:
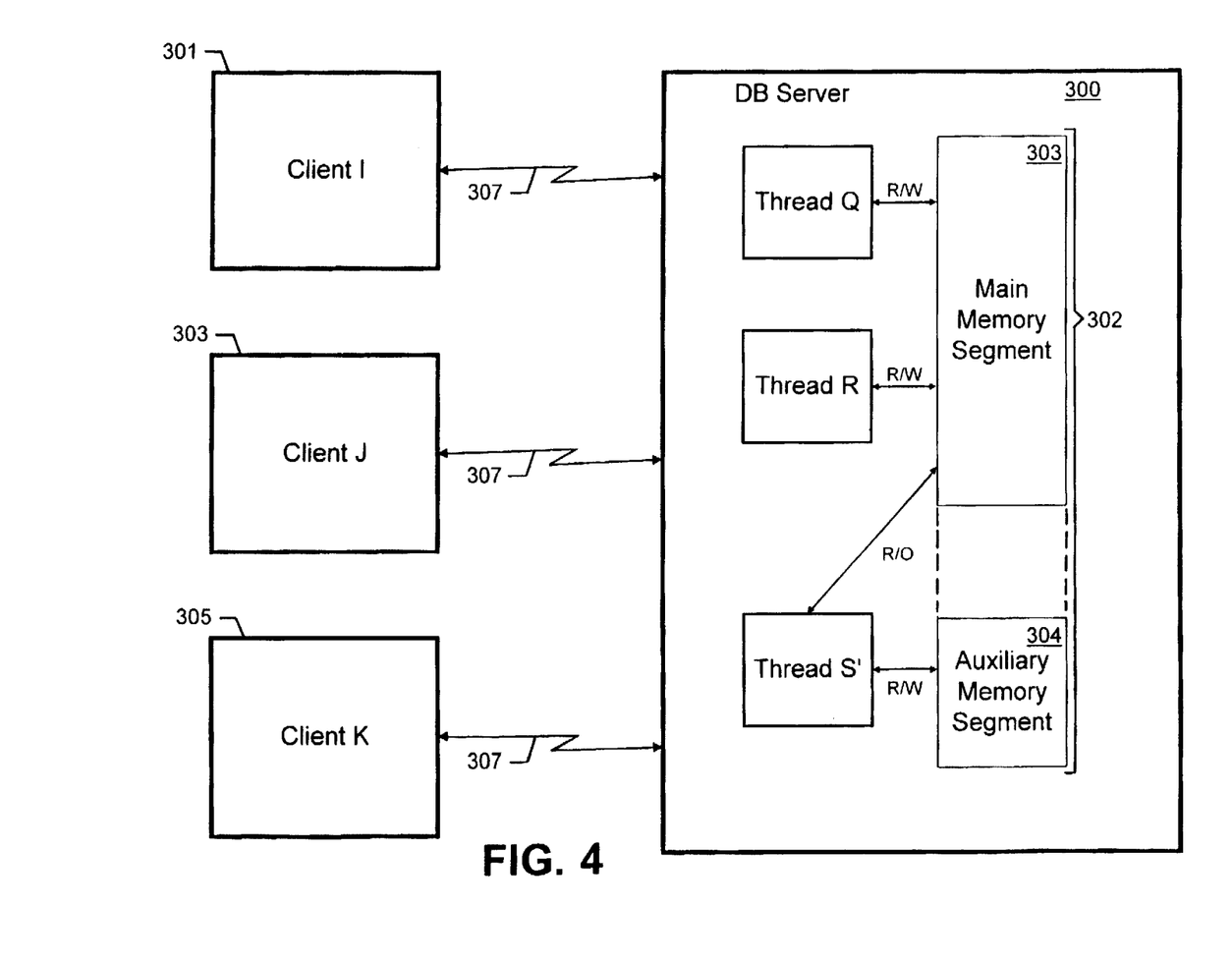
FIG. 4 is a block diagram of a database server architecture having multiple memory segments.

In the multi-process model, isolation can be accomplished in an architecture such as shown in FIG. 4 by maintaining multiple memory segments—a main memory segment 303 and an auxiliary memory segment 304, for example—within the same memory address space 302. Segment 303 serves as the memory region in which trusted core database engine routines and core data structures are executed and stored.

Memory segment 304 serves as an auxiliary memory region reserved primarily for executing and storing routines and data other than those corresponding to core DBMS functions.

A thread executing a trusted routine will remain in, and has full R/W privileges to, the main memory segment 303. To execute an untrusted routine, however, the thread first migrates to the auxiliary memory segment 304 to isolate the thread from the core memory segment 303. A thread executing in the auxiliary memory segment (e.g., thread S') has full R/W privileges to memory segment 304, but has read-only access to memory segment 303. By constraining the areas of memory to which thread S' can write in executing an untrusted routine, the core DBMS data structures and routines are protected from being overwritten by a faulty UDR. Moreover, because trusted and untrusted routines are executed in the same memory address space (although in different memory segments), thread S' need not perform an RPC to perform an untrusted routine but rather can use a standard local procedure call, which generally is more reliable and requires an overhead time that is roughly an order of magnitude less than a RPC. As a result, isolation of untrusted routines can be achieved while maintaining relatively high levels of performance and reliability.

When the database server is implemented using a single process, isolation can be achieved within a core memory segment by modifying R/W privileges based on the nature of the routines being executed. In executing a trusted routine, the thread will have full R/W privileges to core memory in the ordinary fashion. Before executing an untrusted routine, however, R/W permissions to a range of memory that corresponds to core database routines are switched to read-only for the thread that is executing the untrusted routine. Switching R/W privileges to a memory segment can be accomplished by either of two methods: (i) by invoking operating system-specific routines to change R/W permissions on a specified range of memory, or (ii) by detaching the process in which the thread resides from the memory segment and then specifying different R/W access permissions upon reattaching the process to the memory segment. Under both methods, corruption of the database is prevented by prohibiting the untrusted routine from modifying a designated portion of memory.

Figure 5:
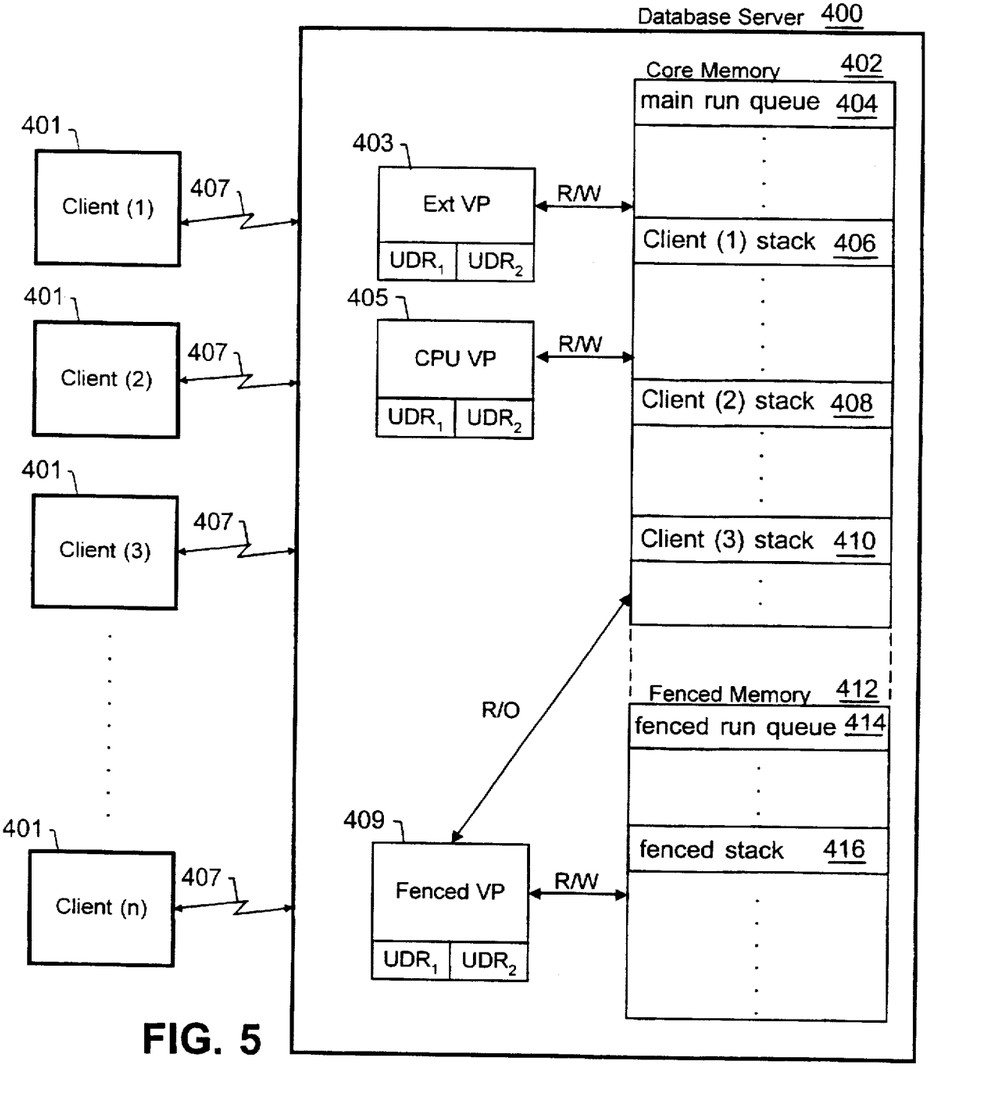
FIG. 5 is a block diagram of the Informix® Universal Server architecture.

A detailed description of how the architecture of FIG. 4 may be used in the Informix® Universal Server to effectively isolate untrusted UDRs from trusted core data structures and DBMS routines is provided with reference to FIG. 5. In the multi-processor environment shown, the IUS® uses multiple memory segments—core memory 402 and fenced memory 412, for example—that occupy the same memory address space but which are logically partitioned from one another. The database server 400 is composed of one or more virtual processors (VPs)—multi-threaded software entities that emulate hardware processors and which can accept and process multiple client requests concurrently. Each VP is an instance of a binary executable file running, for example, as a process in the UNIX operating system. The binary executable file includes the software components needed to form a ORDBMS plus the software components that provide the ability to interface with extensions containing UDRs for handling arbitrary data types.

VPs come in a variety of classes, each class defining certain characteristics that control the privileges available to, and the restrictions imposed upon, VPs within that class. Each routine that is linked to the database engine, whether a core database routine or a UDR, has an associated parameter, VPCLASS, that designates the class of VP with which the routine is to be executed. In general, a collection of functionally related routines is assigned to the same VP class. The VPCLASS parameter may be changed at start-up to specify a different class depending on the desired configuration of the database server.

The database server may be composed of several different VPs, either from the same or different classes. The VPs are linked to a library of core database routines which are included as part of the IUS® system. The VPs also may be linked to one or more UDRs, for example, $UDR_1$ and $UDR_2$ as shown in FIG. 5, which have been custom-designed to manage arbitrary data types specified by a user of the IUS® system. Both the core database routines and the UDRs are implemented in the IUS® architecture using DataBlade® technology developed by Informix®, Inc. A detailed description of DataBlade® technology and how it may be used to create new UDRs is provided in the DataBlade® Developers Kit 9.01 (Informix Order No. 82181), which is incorporated by reference.

In the configuration shown in FIG. 5, the database server includes three different VPs 403, 405 and 409, each belonging to a different class. CPU VP 405 belongs to the VP class "cpu," the class that runs routines most efficiently and which is the default VP class for most of the core database routines. CPU VP 405 receives and handles all incoming database queries or other client requests in the first instance. In processing a client request, the CPU VP may invoke other classes of VPs to perform specialized functions. For example, CPU VP 405 may invoke Extension VP 403 (VPCLASS="ext") to service a blocking I/O request, thereby freeing the CPU VP to handle other client requests.

All VP classes have static R/W privileges which are determined at the time of start-up of the database server. Unless otherwise specified, all VP classes by default have full R/W privileges to core memory 402. An extension VP may be designated, however, to run as a fenced VP by setting its VPCLASS to "fenced." Other VP classes (e.g., "cpu," "aio," "tli") ordinarily do not support a fenced mode of operation.

In FIG. 5 accordingly, Fenced VP 409 (i.e., an extension VP having its VPCLASS set to "fenced") has full R/W privileges to fenced memory 412 but is limited to read-only access to core memory 402. By setting the VPCLASS parameter appropriately, the manner in which a routine is treated (e.g., trusted versus untrusted) can be controlled. To run a UDR as a trusted routine, VPCLASS is set to "cpu" meaning that a CPU VP will execute the routine in the same manner as the core database engine routines. To run a UDR as a trusted routine but in a memory segment other than the core memory segment, VPCLASS is set to a VP class identifier other than "cpu," for example, "ext." To run as an untrusted routine in a memory segment other than the core memory segment, VPCLASS includes the identifier "fenced" meaning that the routine is to be executed by a VP that is "fenced off" from (i.e., unable to write to) the core memory segment.

Figure 6:
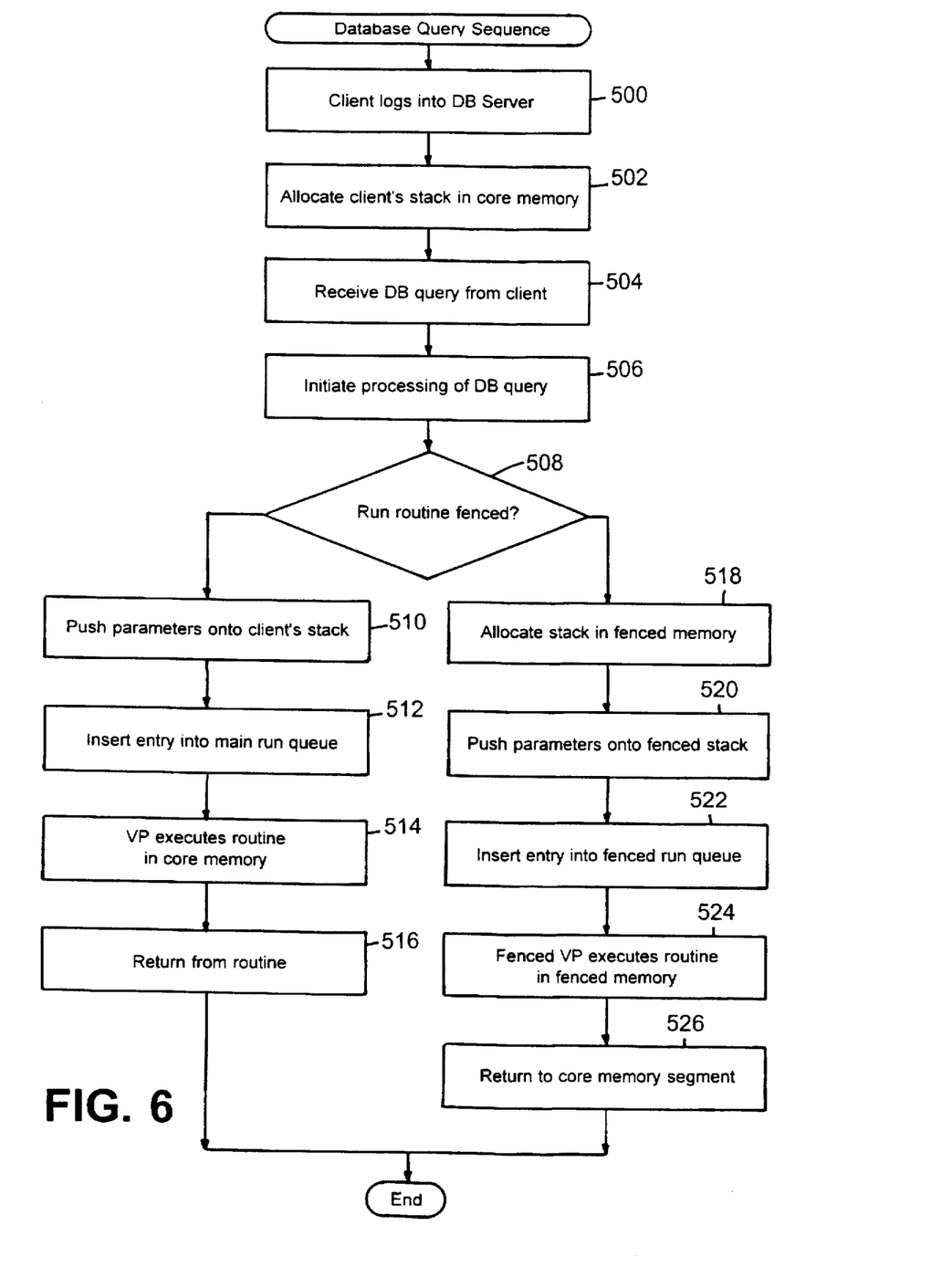
FIG. 6 is a flowchart of executing routines in the Informix® Universal Server architecture of FIG. 5.

An explanation of how the database server switches between trusted and untrusted routines is provided with reference to the flowchart of FIG. 6. A client accesses the database server 400 by connecting, or "logging in," to the server (step 500) and issuing one or more requests (e.g., SQL queries) over the course of a login session. Upon first connecting to the database server 400, each client is allocated a memory stack by the CPU VP 405 through a call to a core database routine, mt__alloc__stack( ) (step 502). The client's allocated stack region is used by one or more execution threads associated with that client in servicing the client's database requests issued during the login session. The stack allocation routine also is invoked when additional space is needed by an existing stack or to spawn a new worker thread for parallel processing of a client request.

When a client sends a database query or other request to the database server (step 504), CPU VP 405 initiates processing of the query by determining which routines need to be executed to retrieve the specified information and present it in the appropriate format (step 506). As part of the processing, the CPU VP 405 also likely will perform query optimization analysis and will initiate the execution of database manipulation operations.

Eventually, the CPU VP typically will reach a point where one or more routines need to be executed to service the client's request. For each routine to be executed, CPU VP 405 examines the routine's VPCLASS parameter to determine whether the routine is to be executed by a VP that has full R/W privileges to core memory 402 or by Fenced VP 409, which has read-only privileges to core memory 402 (step 508). The bulk of the routines that are performed in servicing a client request typically are trusted core database routines which are executed in core memory 402 either by CPU VP 405 itself or by a unfenced VP of a class other than "cpu" (e.g., Extension VP 403). Some of the routines that are to be performed in servicing a client request, however, may be untrusted UDRs which are executed by Fenced VP 409 in fenced memory segment 412 to isolate the UDRs from the core database memory.

If the VPCLASS parameter accordingly does not include the word "fenced," the routine is treated as trusted. To do so, CPU VP 405 pushes parameters for the routine onto the client's stack in core memory 402 (step 510), and inserts into the main run queue 404 an entry for a thread to execute the routine (step 512). When the main run queue 404 next points to the routine's thread entry, a VP from the class specified by the routine's VPCLASS parameter picks up the thread and executes the requested routine in core memory 402 by popping the parameters off the client's stack and using them to perform the instructions specified by the routine (step 514). In performing a trusted routine, the VP on which the routine is running is allowed to freely write to and read from core memory 402 as needed. Upon completion, the routine pushes any return parameters onto the client's stack and returns control to the appropriate location (516).

If, however, the VPCLASS parameter includes the word "fenced," the thread running in CPU VP 405 migrates to Fenced VP 409 so that the routine (typically a UDR) can be executed in fenced memory segment 412. CPU VP 405 initiates migration of the thread by calling a core database routine, mt__priv__call( ), which in turn calls mt__alloc__stack( ) to allocate a memory stack (fenced stack 416) in the fenced memory segment 412 rather than in core memory segment 402 (step 518). After the stack has been allocated, mt__priv__call( ) performs a context switch by pushing parameters for the UDR onto the fenced stack 416 (step 520), and inserting a thread entry into a fenced run queue 414, which is separately maintained for running untrusted routines. The Fenced VP subsequently executes the untrusted UDR in fenced memory segment 412 when the queued thread next runs (step 524).

In executing a UDR, Fenced VP 409 may freely read from and write to fenced memory segment 412 but is prevented from writing to the core memory segment 402. Rather, Fenced VP 409 has read-only access to the core memory segment 402 to allow Fenced VP 409 to read data in segment 402 as needed to perform the untrusted UDR. Fenced VP 409 is able to access resources residing in core memory 402 through internal routines provided by the multi-threading (MT) interface, the server application program interface (SAPI) and the user-defined routine language manager (UDRLM). These internal routines detect whether the performance of a particular routine requires the thread to migrate between memory segments. The SAPI interface library defines the supported routines that may be called by a UDR. A SAPI routine will detect upon entry that the current context is untrusted. If a routine executing in an untrusted context needs to modify core memory, it will switch to a trusted context via the mt_priv_call( ), perform the desired operations and switch back to the untrusted context with another mt_priv_call( ). Virtually any arbitrary number of switches between trusted and untrusted contexts may be performed in this manner. By selectively switching contexts as needed, the thread of execution can move between memory segments and VPs in a manner that is transparent to the client processes and to the UDRs.

If during the execution of an untrusted routine, the Fenced VP executes an instruction that attempts to modify memory in the core memory segment while the thread is executing in the fenced memory segment, the Fenced VP is prevented from doing so. As a result, the core memory segment is protected from being improperly modified by a faulty UDR. Moreover, because the various operations involved with performing untrusted UDRs all take place within the same memory address space, only local calls are needed to switch between the memory segments thereby enhancing the speed and reliability with which the routines may be performed.

After the UDR has completed its execution in the fenced memory segment 412, a return from the mt_priv_call( ) routine is performed so that the thread of execution migrates back to the CPU VP 405 in the core memory segment 402 (step 526). Because mt_priv_call( ) is merely another call on the thread's stack, returning from it returns the thread to the context from whence it came. As a result, the thread deallocates any resources it created in the fenced memory segment and commences execution in CPU VP 405.

Although the database server memory in FIG. 5 is divided into two segments 402 and 404, an architecture having more memory segments could be implemented. The database server memory could be divided into three or more segments—for example, one core segment and two or more fenced segments. Trusted routines can be executed in the core segment and UDRs can be executed in various fenced segments based on different classes to which the UDRs were assigned. For example, UDRs that had undergone considerable testing for proper operation and which had proven reliable could be assigned to a first VP class while UDRs that had undergone little or no testing could be assigned to one or more other VP classes. The proven-reliable UDRs belonging to the first VP class could be executed in one memory segment while the untested UDRs belonging to the other classes could be executed in separate memory segments to isolate them from the other UDRS. Isolating untested UDRs in this manner would prevent them not only from corrupting the core database server memory but also from crashing other UDRs.

Moreover, the use of multiple fenced segments facilitates easier fault identification. If multiple UDRs are executed in a single memory segment, determining which UDR is faulty can be difficult. By isolating UDRs to different memory segments, a faulty UDR can be identified from among several UDRs by determining which memory segment has been corrupted.

Although each VP runs as a separate process on a UNIX-based platform, the collection of all active VPs could run on other platforms as a single process having multiple threads. The number and types of VPs that are present in the database server depends on the goals of the enterprise and is a matter of design choice for the system administrator. Each instance of a VP is a multi-threaded entity that can accept and process multiple client requests concurrently. For each class of VP, more than one instance of the VP may be active at the same time. For example, multiple instances of the CPU VP may be active at the same time, each servicing one or more client requests concurrently.

Similarly, multiple instances of the fenced VP may exist, each executing one or more UDRs in parallel. A single instance of a fenced VP alternatively may process all UDRs or each call to an untrusted routine may be serviced by a dedicated instance of the fenced VP. Although the VPs in the architecture of FIG. 5 use static R/W permissions (i.e., either full or fenced), different architectures are possible where the permissions for the VPs are switched dynamically based on whether or not a VP is executing a routine that is to be fenced from the core memory segment. Moreover, rather than spawning all VP instances at start-up, an instance of a VP could be spawned dynamically as needed, for example, in response to calling an untrusted UDR.

Figure 7:
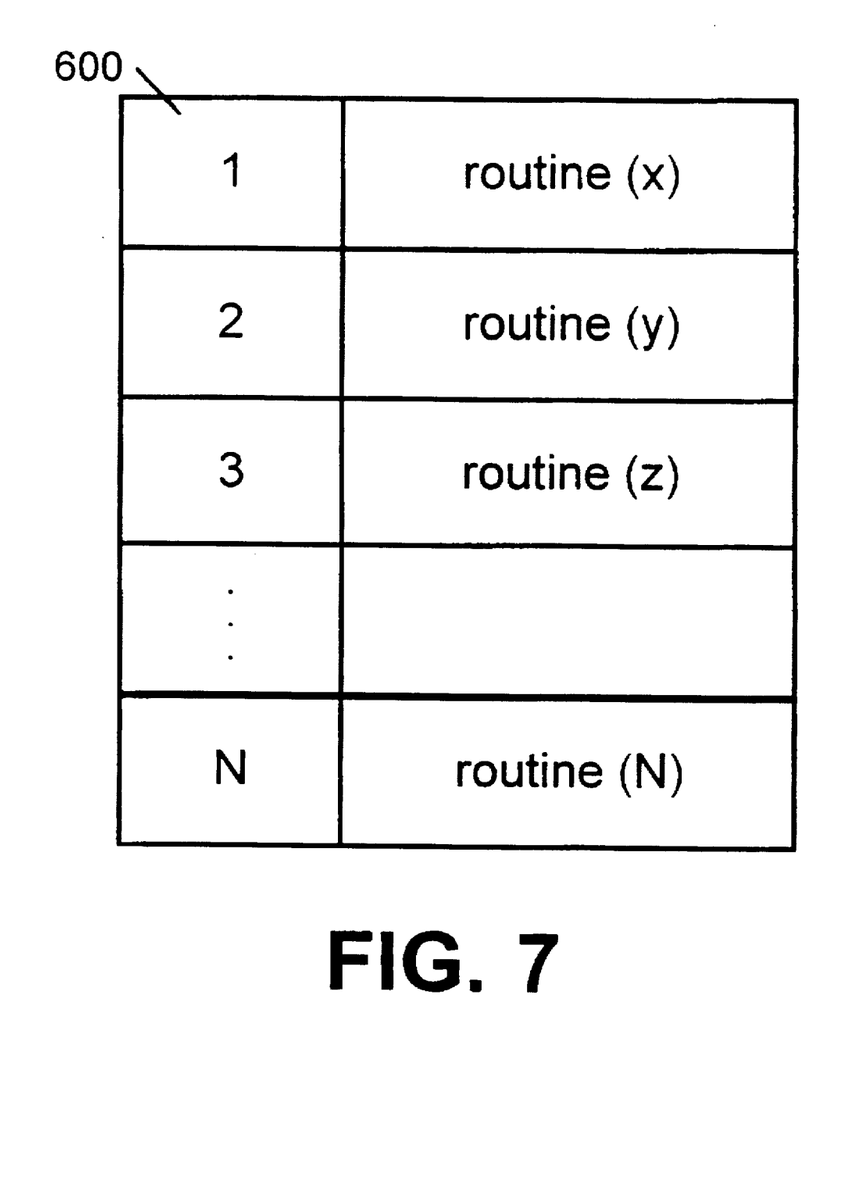
FIG. 7 is a data diagram of a call back table that may be used in the Informix® Universal Server architecture of FIG. 5.

In an alternative embodiment, a fenced VP executing an untrusted UDR can perform "call backs" to core memory to access resources residing there while maintaining isolation of the untrusted UDR. The IUS system maintains a table of allowable routine calls that modify resources residing in core memory. A fenced VP can invoke any of the routine calls specified in the call back table by indicating the corresponding ordinal position in the table for the desired routine. As shown in FIG. 7, for example, the fenced VP would designate position two (2) in the call back table 600 when the fenced VP wanted to invoke routine (y). When an unfenced VP, in order to perform the requested routine in core memory, next picked up the thread that was previously executing on the fenced VP, the unfenced VP would ensure that the memory address pointed by the routine call was a legitimate and safe execution entry point in core memory by confirming that the requested routine was listed in call back table 600. If the requested routine was not listed in call back table 600, execution of the requested routine would be blocked—i.e., the unfenced VP would not execute the requested routine. In this manner, the call back table mechanism limits the routine calls that may be made by a fenced VP thereby preventing it from jumping to a potentially improper location in core memory.

The call back table may be implemented in at least two different manners. First, the call back table could contain a list of addresses of allowable routines. A UDR seeking to call back to core memory would provide an entry point identifier to be used as an index to the call back table. An unfenced VP would perform the routine pointed to by the particular entry point identifier supplied by the UDR. Alternatively, the call back table could be a list of legal execution addresses in core memory. Any entry point specified by a UDR would be checked against the execution addresses listed in the call back table to confirm the entry point's validity.

The methods and mechanisms described here are not limited to any particular hardware or software configuration, but rather they may find applicability in any computing or processing environment in which database operations may be performed.

The techniques described here may be implemented in hardware or software, or a combination of the two.

Preferably, the techniques are implemented in computer programs executing on programmable computers that each includes a processor, a storage medium readable by the processor (including volatile and non-volatile memory and/or storage elements), and suitable input and output devices. Program code is applied to data entered using an input device to perform the functions described and to generate output information. The output information is applied to one or more output devices.

Each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Other embodiments are within the scope of the following claims.

What is claimed is:

1. A method, performed by a database server, of executing one or more database manipulation routines to perform a corresponding database operation, the method comprising:

determining whether a database manipulation routine is to be isolated from a specified range of core memory;

selectively switching a core memory access permission for the database manipulation routine based on the determination; and executing the database manipulation routine using the selectively switched core memory access permission.

2. The method of claim 1 in which the determining comprises inspecting a parameter associated with the database manipulation routine.

3. The method of claim 2 further comprising, prior to the determining, setting the parameter to a value that specifies a class of processor for executing the database manipulation routine.

4. The method of claim 3 in which the setting comprises assigning the parameter a value that specifies a class of processor that is isolated from the specified range of memory.

5. The method of claim 1 in which the selective switching comprises making a local procedure call.

6. The method of claim 1 in which the selective switching comprises setting the memory access permission for the database manipulation routine to read-only for the specified range of memory if the database manipulation routine is determined to be a routine that is to be isolated from the specified range of memory.

7. The method of claim 1 in which the selective switching comprises setting the memory access permission for the database manipulation routine to read/write for the specified range of memory if the database manipulation routine is determined to be a routine that is not to be isolated from the specified range of memory.

8. The method of claim 1 in which the selective switching comprises migrating a thread of execution for the database manipulation routine from a processor that has read/write permission to the specified range of memory to a processor that has read-only permission to the specified range of memory.

9. The method of claim 8 in which the migrating comprises maintaining the thread of execution within a same address space as the specified range of memory.

10. The method of claim 1 in which the selective switching comprises switching from a trusted context in which a thread of execution for the database manipulation has read/write permission to the specified range of memory to an untrusted context in which the thread of execution has read-only permission to the specified range of memory.

11. The method of claim 10 further comprising detecting that the thread of execution requires access to a resource residing in the specified range of memory for which the thread of execution has read-only access to execute the database manipulation routine.

12. The method of claim 11 further comprising, upon detecting that the thread of execution requires access to a resource residing in the specified range of memory, switching from the untrusted context to another trusted context in which the thread of execution has read/write permission to the specified range of memory.

13. The method of claim 12 further comprising switching from the another trusted context to the untrusted context after the thread of execution for the database manipulation routine has completed accessing the resource in the specified range of memory.

14. The method of claim 13 further comprising switching from the untrusted context to the trusted context after execution of the database manipulation routine has completed.

15. The method of claim 1 in which the selective switching comprises performing an arbitrary number of switches between a trusted context and an untrusted context.

16. The method of claim 1 in which the executing comprises remaining in a same address space as the specified range of memory while executing the database manipulation routine.

17. The method of claim 1 in which the executing comprises performing the database manipulation routine with a processor that has read-only permission to the specified range of memory if the database manipulation routine is determined to be a routine that is to be isolated from the specified range of memory.

18. The method of claim 1 in which the executing comprises performing the database manipulation routine with a processor that has read/write permission to the specified range of memory if the database manipulation routine is determined to be a routine that is not to be isolated from the specified range of memory.

19. The method of claim 1 in which the executing comprises performing the database manipulation routine in a memory segment that is logically partitioned from the specified range of memory if the database manipulation routine is determined to be a routine that is to be isolated from the specified range of memory.

20. The method of claim 1 in which the executing comprises performing the database manipulation routine in the specified range of memory if the database manipulation routine is determined to be a routine that is not to be isolated from the specified range of memory.

21. The method of claim 1 in which the executing comprises selectively allowing modification of resources residing in the specified range of memory.

22. The method of claim 21 in which the selective modification is limited to one or more permissible execution entry points in the specified range of memory.

23. The method of claim 22 further comprising specifying the one or more permissible execution entry points in a call back table.

24. A method, performed by a database server, of executing one or more database manipulation routines to perform a corresponding database operation, the method comprising:

dividing a core database memory address space into memory segments;

selectively executing a database manipulation routine in a first memory segment; and preventing the executing database manipulation routine from writing information to another of the memory segments.

25. The method of claim 24 further comprising allowing the database manipulation routine executing in the first memory segment to read information from another memory segment.

26. The method of claim 24 further comprising allowing the database manipulation routine executing in the first memory segment to migrate to another memory segment to perform a predetermined routine.

27. The method of claim 26 further comprising checking whether an entry point specified for the predetermined routine in the another segment is a permissible entry point.

28. The method of claim 27 in which the checking comprises comparing the specified entry point against a predetermined set of one or more permissible entry points.

29. The method of claim 27 further comprising blocking execution of the predetermined routine if the specified entry point in the another segment is an impermissible entry point.

30. The method of claim 24 further comprising returning the database manipulation routine to the first memory segment after the predetermined routine has completed.

31. The method of claim 24 in which the database manipulation routine is executed in the first memory segment if the database manipulation routine is identified as one from which information in another memory segment is to be protected.

32. The method of claim 31 in which the database manipulation routine from which information in another memory segment is to be protected comprises a user-defined routine.

33. The method of claim 31 in which the database manipulation routine from which information in another memory segment is to be protected comprises an untrusted routine.

34. The method of claim 24 further comprising, if the database manipulation routine is not identified as one from which information in another memory segment is to be protected, executing the database manipulation routine with full read and write privileges to all memory segments.

35. The method of claim 34 in which the database manipulation routine comprises a trusted routine.

36. The method of claim 24 in which the memory segments reside in the same memory address space.

37. The method of claim 36 in which the dividing comprises logically partitioning the memory segments from each other.

38. The method of claim 24 in which the selective executing comprises performing the database manipulation routine with a process that has read-only access to memory segments other than the first memory segment.

39. The method of claim 38 in which the process comprises a multi-threaded virtual processor.

40. The method of claim 24 further comprising concurrently executing a plurality of database manipulation routines in respective ones of the memory segments, each database manipulation routine having read-only access to all memory segments other than its own memory segment.

41. A database server comprising:

a shared memory address space having a plurality of memory segments including a core memory segment and a fenced memory segment;

a plurality of database manipulation routines collectively representing a database operation, the routines including a trusted routine that is allowed to modify the core memory segment and an untrusted routine that is prohibited from modifying the core memory segment; and a plurality of virtual processors linked to the plurality of routines, the virtual processors including a full-access virtual processor that executes trusted routines in the core memory segment and a fenced virtual processor that executes untrusted routines in the fenced memory segment.

42. The database server of claim 41 in which the full-access virtual processor has read/write access to all memory segments.

43. The database server of claim 41 in which the fenced virtual processor has read-only access to the core memory segment.

44. The database server of claim 41 in which each database manipulation routine has an associated parameter that specifies whether the routine is a trusted routine or an untrusted routine.

45. The database server of claim 41 further comprising a thread for executing database manipulation routines, the thread migrating from one virtual processor to another virtual processor based on whether the database manipulation routine being executed is trusted or untrusted.

46. The database server of claim 45 in which the thread migrates to a fenced virtual processor if the database manipulation routine being executed is an untrusted routine.

47. The database server of claim 45 in which the thread migrates to a full-access virtual processor if the database manipulation routine being executed is a trusted routine.

48. Computer software, residing on a computer readable medium, for a database server having linked routines for performing database manipulation methods, the computer software comprising instructions for causing a computer to perform the following operations:

(a) receive a database query from a client;

(b) identify which routines to perform to service the database query, each identified routine being either a trusted routine that is allowed to modify a core database memory or an untrusted routine that is prohibited from modifying the core database memory;

(c) perform one or more trusted routines using read/write access to the core database memory; and (d) perform one or more untrusted routines using read-only access to the core database memory.

49. The computer software of claim 48 in which (d) comprises instructions to cause a thread of execution to migrate from a first processor having read/write access to the core database memory to another processor having read-only access to the core database memory.

50. The computer software of claim 48 in which (d) comprises instructions to change memory access permission for the core database memory to read-only in connection with performing an untrusted routine.

* * * * *